United States Patent [19]

Takagi et al.

[11] Patent Number: 4,654,796
[45] Date of Patent: Mar. 31, 1987

[54] SYSTEM FOR COMPUTING CORRECTION FACTORS FOR SENSITIVITY DIFFERENCES IN DETECTOR CHANNELS OF AN X-RAY TOMOGRAPHY APPARATUS

[75] Inventors: Hiroshi Takagi; Kouichi Koike; Hiroyuki Takeuchi, all of Chiba, Japan

[73] Assignee: Hitachi Medical Corporation, Tokyo, Japan

[21] Appl. No.: 644,376

[22] Filed: Aug. 27, 1984

[30] Foreign Application Priority Data

Aug. 29, 1983 [JP]   Japan .................................. 58-158662

[51] Int. Cl.⁴ .......................... G06F 15/42; A61B 6/00
[52] U.S. Cl. ..................................... 364/414; 378/901
[58] Field of Search ................... 364/414; 378/19, 901

[56]                References Cited

U.S. PATENT DOCUMENTS

| | | | |
|---|---|---|---|
| 4,035,651 | 7/1977 | Lemay | 364/414 |
| 4,038,551 | 7/1977 | Lemay | 378/901 |
| 4,206,360 | 6/1980 | Lemay | 364/414 |
| 4,472,823 | 9/1984 | Waltham | 364/414 |

*Primary Examiner*—Jerry Smith
*Assistant Examiner*—Gail Hayes
*Attorney, Agent, or Firm*—Gerald J. Ferguson, Jr.; Michael P. Hoffman; Ronni S. Malamud

[57]                ABSTRACT

In an X-ray tomograph having an X-ray source and a multi-channel detector rotatable around a body under examination, circuitry for compensating for changes in the characteristics of the X-ray source or the channels of the detector by extracting from the X-ray transmission data at least one sensitivity correction component and using this component to correct the transmission data and thus effect the desired compensation.

14 Claims, 11 Drawing Figures

(A)

(B)

(C)

(D)

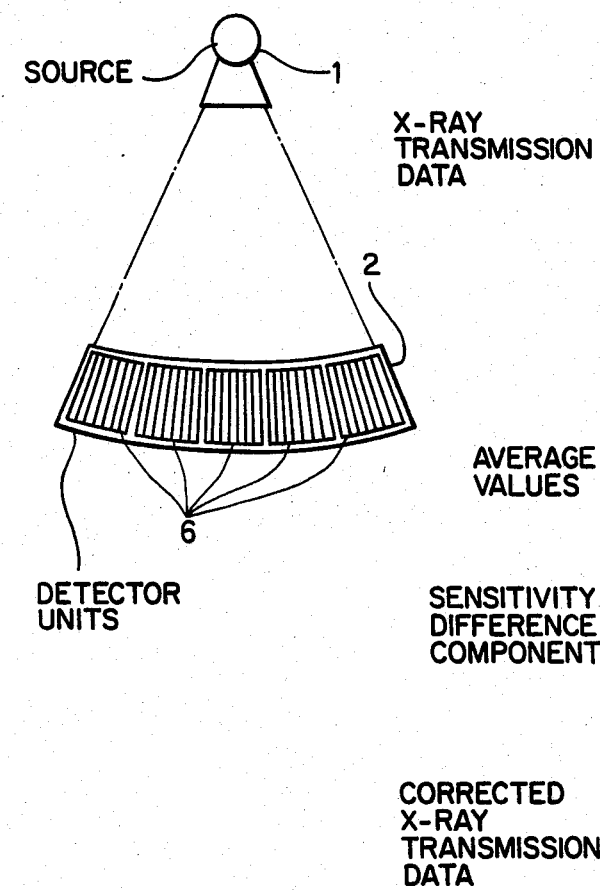

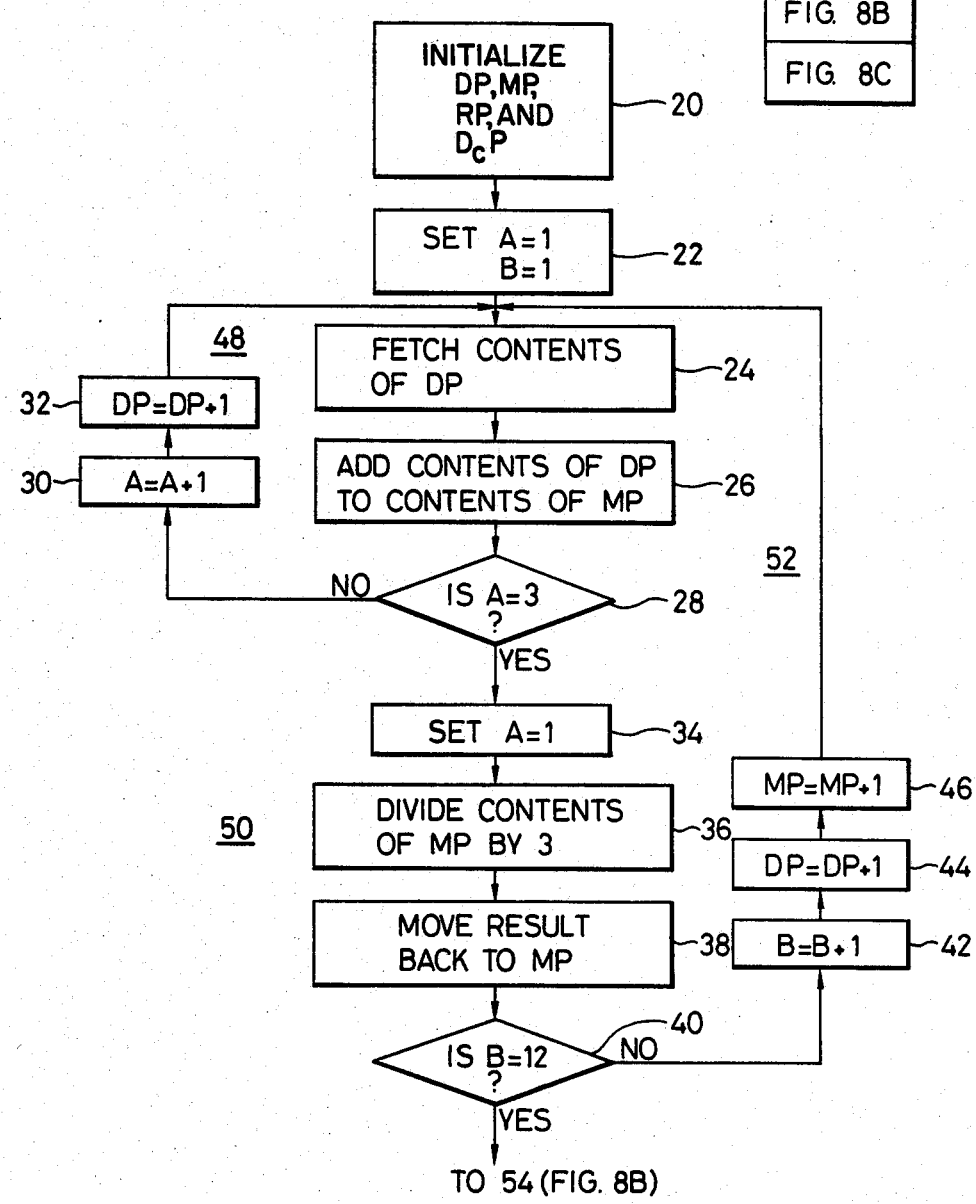

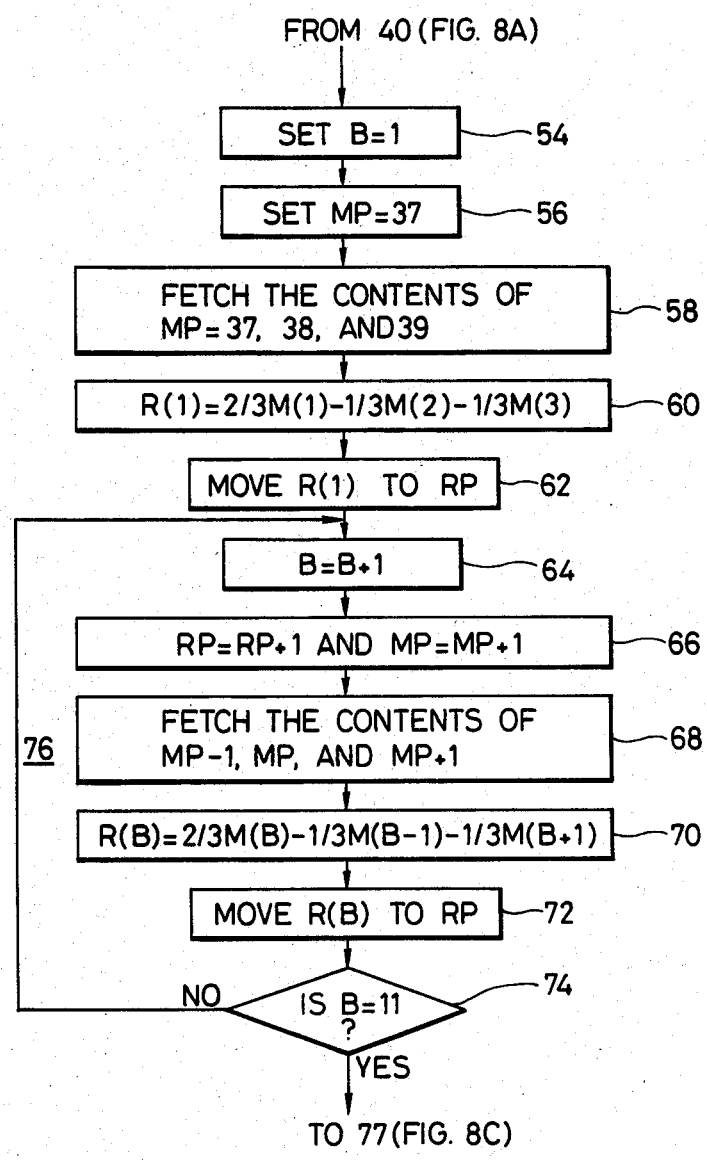

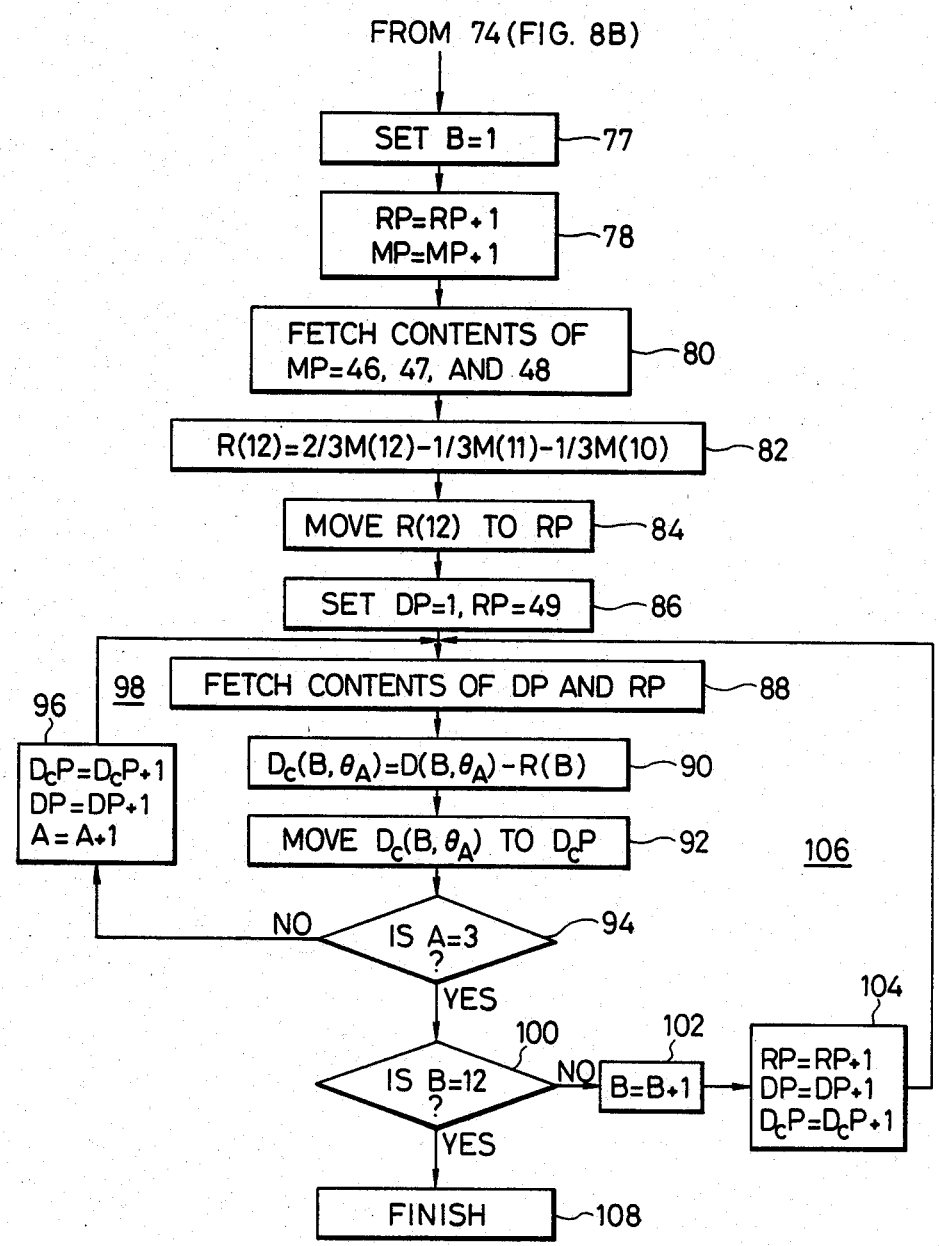

SYSTEM FOR COMPUTING CORRECTION FACTORS FOR SENSITIVITY DIFFERENCES IN DETECTOR CHANNELS OF AN X-RAY TOMOGRAPHY APPARATUS

BACKGROUND OF THE INVENTION

1. Field of the Invention

This invention relates to an X-ray tomograph using a computer (hereinafter referred to as "an X-ray-operated CT apparatus", when applicable); and more particularly to an X-ray-operated CT apparatus having a data processing function adapted to correct the difference in sensitivity of the different channels of a multi-channel X-ray detector unit.

2. Discussion of Prior Art

In an X-ray-operated CT apparatus, as shown in FIG. 1, an X-ray tube 1 and a multi-channel X-ray detector unit 2 are revolved around the axis of revolution 0 to thus revolve around an object or body 3 under examination. X-ray transmission data of body 3 are collected so that the image of a plane section of the body is formed by an image reconstructing unit 4 and is displayed by a display unit 5. Due to the sensitivity difference of the different channels of multi-channel X-ray detector unit 2, a concentric-circle-like pattern called an "artefact" is formed in the plane section image. In order to eliminate the artefact in the conventional X-ray-operated CT apparatus, a calibrating test body having a predetermined configuration is used or the body 3 under examination is removed from the apparatus. X-ray transmission data are then collected to form sensitivity correcting data which are used in the formation of the plane section image. In particular, the sensitivity correcting data are used to correct the errors in the X-ray transmission data of body 3 which are caused by the sensitivity difference of the different channels of multi-channel X-ray detector unit 2.

However, in the above-described method, the dose and photon energy of X-rays in an X-ray-operated CT apparatus change with time. For instance, the dose and photon energy of X-rays change as the resistance (or temperature) of the filament or the characteristics of the target of X-ray tube 1 vary with time. In addition, the temperature characteristics or electrical characteristics of the different channels of multi-channel X-ray detector unit 2 change with time.

Since the dose and photon energy of X-rays in an X-ray-operated CT apparataus change as described above, the different channels of the multi-channel X-ray detector unit become different in the dose and photon energy of X-rays with respect to one another. Therefore, no uniformity is established between the collection of sensitivity correcting data and the collection of X-ray transmission data. Accordingly, the sensitivity difference mentioned above can not be accurately corrected, and therefore it is difficult to completely eliminate artefacts. In this regard, the conventional X-ray-operated CT apparatus is not advantageous.

SUMMARY OF THE INVENTION

An object of this invention is to provide an X-ray-operated CT apparatus which provides a plane section image excellent in quality, being free from artefacts.

The foregoing object and other objects, as well as novel features of the invention, will become more apparent from the following detailed description when read in conjunction with the accompanying drawings.

A typical one of the embodiments of the invention can be summarized as follows. In an X-ray-operated CT apparatus, the sensitivity difference components of the different channels of the multi-channel X-ray detector unit are extracted from the X-ray transmission data of a body or object under examination, and are employed as sensitivity correction data, so that the formed image of a plane section of the body or object is excellent in quality, having no artefacts.

BRIEF DESCRIPTION OF THE DRAWINGS

FIGS. 4, 5 and 6 are diagrammatic illustrations of other embodiments of image reconstructing units according to the invention.

FIG. 7 is a diagrammatic illustration of locations used in the memory of the system of the subject invention.

FIG. 8 is a flow chart of a program which further illustrates the operation of the system of FIG. 3.

DESCRIPTION OF PREFERRED EMBODIMENTS OF THE INVENTION

Figure 1:
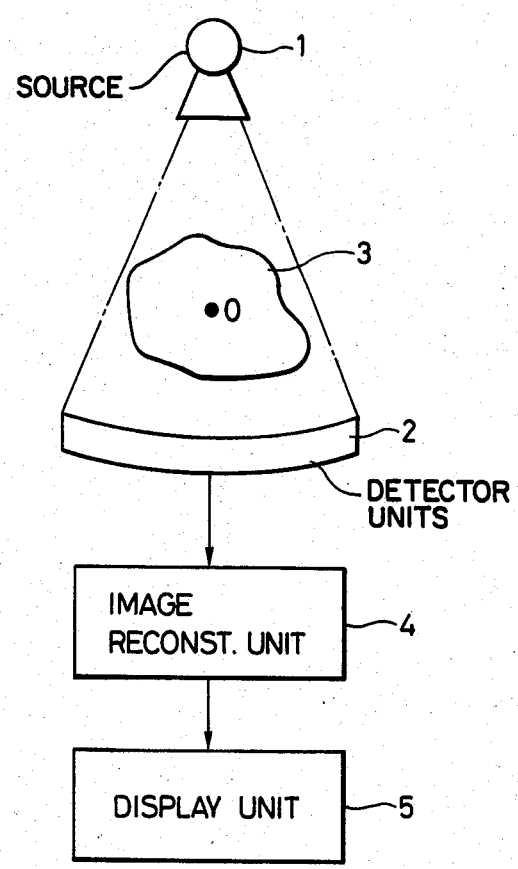
FIG. 1 is a diagrammatic block diagram of a conventional X-ray-operated CT apparatus.
Figure 2:
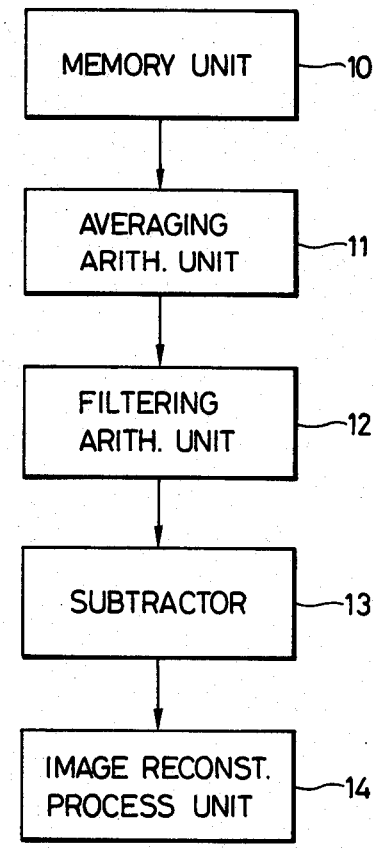
FIG. 2 is a block diagram of one illustrative embodiment of an image reconstructing unit according to this invention.

In FIG. 2, a memory unit 10 stores X-ray transmission data, intermediate calculation result data and final image data. An averaging unit 11 averages X-ray transmission data or intermediate calculation result data for all the rotation angles of X-ray tube 1 and multi-channel X-ray detector unit 2 for every channel. As will be brought out with respect to FIG. 2, the averaging effected by unit 11 may also be implemented for each of a number of different rotation angle ranges. A filtering arithmetic unit 12 subjects the average values of the channels to a filtering operation to remove from the average values all signal information except sensitivity difference components corresponding to the difference in sensitivities of the channels discussed above. A subtractor 13 then subtracts a sensitivity difference component from the X-ray transmission data for each channel to correct the sensitivity differences of the different channels of multi-channel X-ray detector unit 2. The correct data is then applied to an image reconstruction processing unit 14, which corresponds to unit 4 of FIG. 1.

Figure 3:
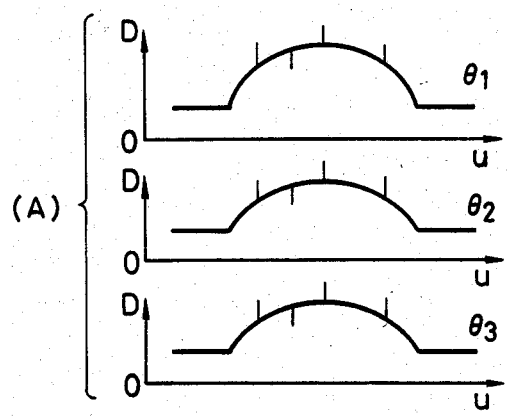
FIGS. 3(A)-3(D) are a graphical representation of the operation of the unit of FIG. 2.
Figure 3:
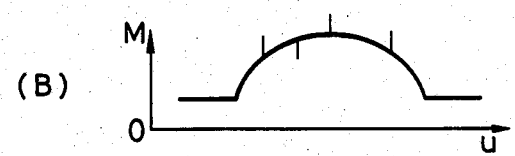
Figure 3:
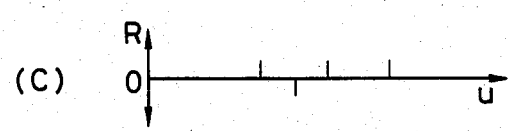
Figure 3:
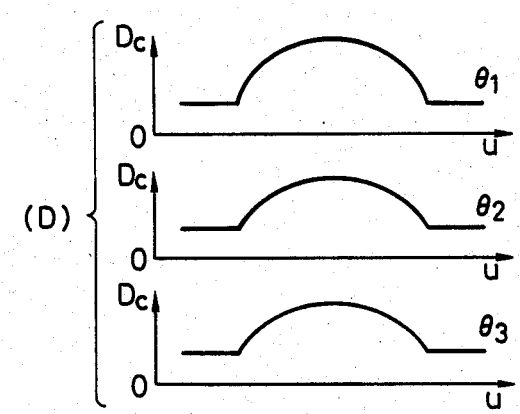

The graphical representation of FIG. 3 illustrates the operation of the FIG. 2 embodiment. In FIG. 3, reference character u designates the channel numbers of the multi-channel X-ray detector unit 2 where, if the number of channels is 12, for example, u=1, 2, 3, ... 12. Of course, u may be more or less than 12, $\theta$ designates a rotation angle of X-ray tube 1 and the multi-channel X-ray detector unit 2 and D designates the X-ray transmission data. Thus, referring to FIG. 3(A) in particular, the data D passing through channels 1-12 as they are rotated past the angle $\theta_1$, where $\theta_1$ corresponds to a particular point or value of the rotation angle $\theta$, are illustrated in the $\theta_1$ graph of FIG. 3(A). Similarly, after passing by the point where $\theta=\theta_1$, the data passing through channels 1-12 at $\theta=\theta_2$, and $\theta=\theta_3$ are respectively illustrated in the $\theta_2$ and $\theta_3$ graphs of FIG. 3(A).

In general, in FIG. 3(A), the transmission data of the X-rays passed through the body under examination is represented by $D(u,\theta)$. An intermediate calculation result derived from $D(u,\theta)$ is $D'(u,\theta)$. The value D or D' includes the sensitivity difference components of the different channels of the multi-channel X-ray detector unit in addition to the data of the body under examination. For ease of illustration, these components are indicated as vertical lines extending above and below the main curves of the $\theta_1$, $\theta_2$, and $\theta_3$ graphs of FIG. 3(A).

Similarly, as in the value D or D', the output M(u) of the averaging arithmetic unit 11 includes the sensitivity difference components of the different channels of the multi-channel X-ray detector unit in addition to the data of the body under examination. M(u) is illustrated in FIG. 3(B) and is obtained for each channel by taking the average of the D (or D') values for all values of $\theta$ such as $\theta_1$, $\theta_2$, and $\theta_3$. Thus, for example, for channel 6 (that is, u=6), the values of D for $\theta_1$, $\theta_2$, and $\theta_3$ are summed and divided by 3 to obtain M(6). Of course, the number of values of $\theta$ may be much larger, the three values $\theta_1$, $\theta_2$, and $\theta_3$ being chosen for ease of illustration. As can be seen in FIG. 3(B), M(u) still contains the sensitivity difference components of the different channels of unit 2, these components again being indicated by the vertical lines extending above and below the main curve. However, M(u), being smoothed or averaged in the direction of $\theta$, is more suitable for extraction of sensitivity difference components R(u) by filtering than $D(u,\theta)$.

The extracted sensitivity difference components R(u) are illustrated in FIG. 3(C) where each of the vertical lines corresponds to a component of a particular channel. Thus, one of the vertical lines may be the sensitivity difference component for the sixth channel, that is R(6). As a means for preventing over correction or compensation, a threshold device (not shown) may be employed whereby if the sensitivity difference component for a particular channel exceeds the threshold, the sensitivity difference component for that channel is limited to either zero or the threshold value. As can be seen from FIGS. 3(B) and 3(C), the main curve of M(u) is removed by filtering leaving vertical lines representing the sensitivity differences remaining. Thus, one of the vertical lines may be the sensitivity difference component for the sixth channel, that is R(6). As a means for preventing over correction or compensation, a threshold device (not shown) may be employed whereby if the sensitivity difference component for a particular channel exceeds the threshold, the sensitivity difference component for that channel is limited to either zero or the threshold value. As can be seen from FIGS. 3(B) and 3(C), the filtering effected by unit 12 of FIG. 2 effectively removes the main curve from the graph of M(u) so that all that remains are the sensitivity difference components R(u). This filtering may be effected in a number of different ways. The first of these is illustrated by equation (1):

$$R(u) = M(u) - \frac{1}{2n+1} \sum_{i=-n}^{i=n} M(u+i) \quad (1)$$

where M(u) represents the average values of FIG. 3(B) and n is the number of channels adjacent to the channel under consideration that enter into the calculation. Thus, for example, if n=1, R(u) for the sixth channel would be evaluated as follows:

$$R(6) = M(6) - \frac{1}{2(1)+1}(M(5) + M(6) + M(7))$$

$$= M(6) - \frac{1}{3}(M(5) + M(6) + M(7)).$$

Thus, an average is formed of the channel under consideration plus the n channels immediately adjacent thereto and this average is subtracted from M(u) to form R(u).

The arithmetic filtering operation of unit 12 may be also effected by a convolution operation represented by the following equation (2):

$$R(u) = \sum_{i=-n}^{i=n} W(i) M(u+i) \quad (2)$$

If n=1, $W(0) = \frac{2}{3}$, and $W(\pm 1) = -\frac{1}{3}$. In this case, the equation (2) approach would be equivalent to the equation (1) approach.

Filtering may also be effected by subjecting M(u) and W(i) to multiplication in Fourier space over the channels and obtaining R(u) by a reverse Fourier transformation.

Once R has been obtained for each channel, that is R(u), each R is subtracted at subtractor 13 of FIG. 2 from its corresponding D (or D') for the channel and rotation angle under consideration to obtain D or D' with the sensitivity difference corrected—that is $D_c(u)$ as shown in FIG. 3(D). Thus, in particular, $D_c(6)$ for $\theta = \theta_1$ is obtained by subtracting R(6) from D(6) (or D'(6)) for $\theta = \theta_1$. $D_c(7)$ for $\theta = \theta_1$ is obtained by subtracting R(7) from D(7) for $\theta = \theta_1$. In this manner, the $D_c$ curve with the sensitivity difference components removed for the $\theta_1$ curve of FIG. 3(D) is obtained. The $\theta_2$ curve of FIG. 3(D) is obtained in a similar manner where, for example, the $D_c(6)$ for $\theta = \theta_2$ is obtained by subtracting R(6) from D(6) (or D'(6)) for $\theta = \theta_2$. The corrected data thus derived in the $\theta_1$, $\theta_2$, and $\theta_3$ curves of FIG. 3(D) may now be processed in a conventional manner by image reconstruction unit 14.

It should be noted, the X-ray transmission data $D(u,\theta)$ or the intermediate data $D'(u,\theta)$ of FIG. 3(A) may be digitized and stored in appropriate memory locations in memory 10. Thus, for 12 channels and three rotation angles $\theta_1, \theta_2$ and $\theta_3$, 36 such locations would be set aside for $D(u,\theta)$. This data is thus available for the calculation of M(u). Since M(u) represents the average of D for each channel over the three rotation angles, there are 12 values of M and these may be stored in memory 10 in locations set aside for this purpose. These values are thus available for the R(u) calculations of either equation (1) or (2), for example. Locations are also available in memory 10 for the R values. Furthermore, the $D(u,\theta)$ values are, of course, still available for the $D_c(u,\theta)$ calculations, the $D_c(u,\theta)$ values also being provided with 36 memory locations corresponding to but different from the 36 locations provided $D(u,\theta)$. Hence, after each of the units 11-14 of FIG. 2 may be considered steps of a computer program where the results derived from each step may be stored in appropriate memory locations in memory 10. Each of these steps has been described in detail above in a manner which readily indicates their software implementation. Accordingly, such a software implementation is contemplated as being within the scope of the invention and an illustrative program for effecting such an implementation will now be discussed with respect to FIGS. 7 and 8 where FIG. 8 is a flow chart of a simplified program and FIG. 7 illustrates locations in memory 10 where locations DP=1 through DP=36 store $u(c,\theta)$ after X-ray source 1 and detector unit 2 have rotated through rotation angle $\theta$; locations MP=37 through MP=48 store the average values for channels 1–12; locations RP=49 through RP=60 store the sensitivity difference components for channels 1–12; and $D_CP=61$ through $D_cP=96$ store the corrected X-ray transmission data $D_c(u,\theta)$.

In operation, as shown in FIG. 8, DP=1, MP=37, RP=49, and $D_cP=61$ are initialized at block 20 while initial values of counters A and B are set at block 22. The contents of DP are then fetched at block 24, the contents being $D(1,\theta_1)$ sinc DP=1 initially. $D(1,\theta_1)$ is then added to the contents of MP=37 at block 26 where the contents of all memory locations are initially set to zero. A check is then made at 28 to set if the A counter equals 3. It does not since it was initially set to one. Thus, A is incremented by one at block 30 and DP by one at block 32. The program then obtains the data located at DP=2 and adds it to that stored at MP=37. This process is repeated one more time until the sum of $D(1,\theta_1)$, $D(1,\theta_2)$, and $D(1,\theta_3)$ are stored at MP=37. The check at 28 is then satisfied so that the program passes to block 34 where A is reset to one. The contents of MP are then divided by 3 at 36 and returned to MP at 38 whereby the average M(1) is now stored at MP=37. A check is now made at 40 as to whether the B counter has reached 12. It has not since at this time it equals its initial value—that is, one. Thus, the program moves to blocks 42, 44, and 46 where B, DP, and MP are respectively incremented by one. The program now obtains the sum of the second channel X-ray data transmission values $d(2,\theta_1)$, $D(2,\theta_2)$, and $D(2,\theta_3)$ at loop 48 in the manner described above for the first channel. The average M(2) for the second channel is also obtained at 50 as described above and is stored at MP=38. The loop at 52 is then repeated and in this manner all of the M(u) values are obtained as loop 52 is repeated 12 times. The foregoing thus implements the function of unit 11 of FIG. 2.

The check at 40 is then passed and the program moves to blocks 54 and 56 were B and MP are respectively reset to B=1 and MP=37. The following section of the program implements the function of unit 12 of FIG. 2 where equation (2) is utilized where n=1. Since M(1) is an end value, it, of course, is not possible to obtain values of M on opposite sides of it. Thus, in this special instance M(2), and M(3) are assumed to be on opposite sides of M(1). Similar considerations apply to end value M(12) where M(10) and M(11) are considered to be on opposite sides thereof. In accordance with the foregoing, the program at 58 fitches the contents of MP=37, 38 and 39 and calculates R(1) at 60 and moves it to the initial value of RP=49 at 62. B, RP and MP are each incremented by one at blocks 64 and 66. The contents of MP−1, MP and MP+1 (that is M(1), M(2), and M(3)) are then fetched at block 68. R(B), that is, R(2) is next calculated at 70 and moved to RP=38 at 72. A check is then made at 74 to see if all the R values except R(12) have been calculated. They have not since B only equals two. Thus loop 76 is repeated until B equals 11. At this time, B is reset to one at block 77 and MP and RP are incremented by one at block 78. R(12) is calculated at 82 and moved to RP=60 at 84. The sensitivity difference components R(u) have now been calculated and all that remains to be done is to use these values for sensitivity correction.

The program now moves to block 86 where DP is reset to one and RP to 49; the original initial values of these memory locations. The contents of DP=1 and RP=49 are then fetched at 88 and used to calculate $D_c(1,\theta_1)$ at 90, the calculation being moved to $D_cP=61$, The initial value thereof at block 92. Note A and B both equal one at this time and thus, referring to block 90, $D_c(1,\theta_1)=D(1,\theta_1)-R(1)$ is calculated. The corrected data transmission values for each angle of the first channel are then calculated as the program passes through loop 98 three times incrementing $D_cP$, DP, and A by one each pass. The test at 94 is finally passed and another test is made at 100 to see if the X-ray transmission values have been calculated for all channels. They have not since B only equals one. Thus, B is incremented by one at 102 and RP, DP, and $D_cP$ are also incremented by one at 104. In this manner, the program passes through loop 106 until the test at 100 is passed, at which the program is completed at 108 and control returned to unit 14 of FIG. 2.

Figure 4:
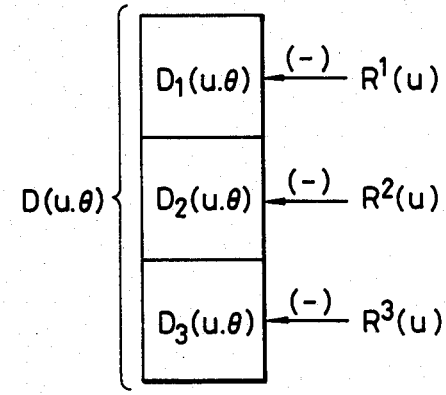

In the embodiment of FIG. 3, the values of R are calculated for all rotation angles $\theta$ with respect to the respective channels. Although only three angles $\theta_1$, $\theta_2$, and $\theta_3$ were employed in illustrating the FIG. 3 embodiment, in actual practice, the number of angles will be much greater than this. In accordance with another embodiment of the invention, as diagrammatically illustrated in FIG. 4, values of R are not calculated for all values of $\theta$. Rather, the angle through which tube 1 and detector unit 2 rotate is divided into a number of subranges and values of R are calculated for each of the subranges. Thus $R^1(u)$ (see FIG. 4) is calculated for the first angular subrange, $R^2(u)$ for the second subrange, $R^3(u)$ for the third, etc. In FIG. 4, $\theta$ is divided into three adjacent subranges where R is calculated for each subrange in exactly the same manner as R is calculated for the total angular range in the FIG. 4 embodiment. Each value of D occurring in the first angular subrange (that is, $D_1(u,\theta)$) is corrected by $R^1(u)$ while $D_2(u,\theta)$ is corrected by $R^2(u)$ and $D_3(u,\theta)$ is corrected by $R^3(u)$.

Figure 5:
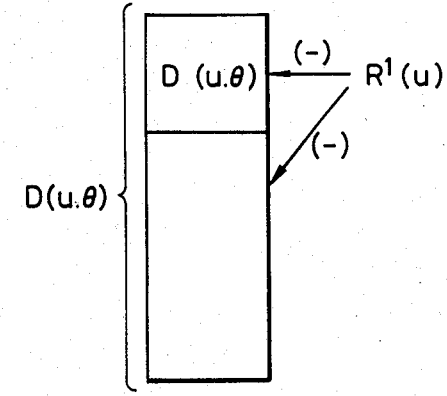

If it is desired to decrease the time required for calculating R(u) in either the embodiments of FIG. 2 or 3, $R^1(u)$ of FIG. 5 may be calculated as described above for a limited angle range less than the total angle through which tube 1 and detector 2 rotate. $R^1(u)$ may then be used to correct all $D(u,\theta)$ (or $D'(u,\theta)$) for all rotation angles. The time required for calculating the sensitivity difference components R(u) may also be effectively reduced by limiting the calculation thereof to a central channel portion of detector 2.

In FIG. 6, an X-ray detector unit 2 having several hundreds of detecting elements is formed by combining a plurality of detecting element blocks 6 each having several to several tens of detecting elments. The time required for calculating R(u) in the FIG. 6 embodiment may be reduced by limiting the calculation thereof to the outermost detecting elements of detecting element blocks 6, R(u), as calculated from the elements, is then applied as the correction factor for the remaining channels.

As is apparent from the above description, even where the sensitivity of the different channels is changed by the X-ray input conditions, or is changed with time or with temperature, the sensitivity difference can be corrected with high accuracy according to the invention. Therefore, the invention can provide a plane section image excellent in quality, substantially free from artefacts and noise.

This invention is not limited to the abovedescribed embodiments, and it will be obvious to those skilled in that art that various changes and modifications may be made thereon without departing from the invention.

What is claimed is:

1. In an X-ray tomograph in which an X-ray source and a multi-channel X-ray detector unit are faced toward each other and are moved with respect to a plane section of a body under examination so that X-ray absorption data of said plane section of said body are collected and analyzed as X-ray transmission data to reconstruct an image of said plane section, the improvement of correcting the difference in sensitivity of the channels of the multi-channel X-ray detector unit to the X-ray absorption data where the difference in sensitivity may arise either due to changes in the characteristics of the X-ray source or the channels of the detector unit and where said difference in sensitivity in each channel is represented by a sensitivity difference component, said improvement comprising means for extracting the sensitivity difference component of at least one channel of said multi-channel x-ray detector unit from a signal corresponding to said X-ray transmission data of the body under consideration; and means for correcting the sensitivity of said at least one channel by subtracting the sensitivity difference component for that channel from the X-ray transmission data for that channel whereby said at least one channel is rendered sensitive to said X-ray absorption data and substantially insensitive to the changes in the characteristics of the X-ray source or the channels of the detector unit.

2. The improvement as in claim 1 where said X-ray source and said detector unit are rotated around said body through an angle $\theta$ and where said tomograph includes means for deriving said signal corresponding to said X-ray transmission data and means for averaging for at least said one channel the values of the X-ray transmission data occurring at a plurality of predetermined angles $\theta_j$ through which X-ray source and detector unit rotate where j equals a plurality of consecutive integers starting with one.

3. The improvement as in claim 2 where said means for extracting the sensitivity difference component includes means for respectively extracting a plurality of sensitivity difference components R(u) from a plurality of said channels of the multi-channel detector unit where u represents the number of the channel for which the sensitivity difference component has been extracted.

4. The improvement as in claim 3 where said means for aveaging the X-ray data transmission values of at least one channel includes means for obtaining an average value M(u) for each said plurality of channels where the average value for each channel is obtained by averaging the values of X-ray transmission data for that channel occurring at said plurality of predetermined angles.

5. The improvement as in claim 4 where the means for extracting the sensitivity components R(u) is effected in accordance with the equation $$R(u) = M(u) - \frac{1}{2n+1} \sum_{i=-n}^{i=n} M(u+i)$$

where n is the number of channels including and adjacent to the channel u for which R(u) is determined.

6. The improvement as in claim 4 where the means for extracting the sensitivity components is effected in accordance with the equation $$R(u) = \sum_{i=-n}^{i=n} W(i)M(u+i)$$

where n is the number of channels including and adjacent to the channel u for which R(u) is determined and W(i) is a weight factor depending on the value on i.

7. The improvement as in claim 3 where the X-ray transmission data for each of said plurality of channels occurring at said plurality of predetermined angles is represented by $D(u,\theta)$ and where said correcting means subtracts R(u) from $D(u,\theta)$ such that R(1) is subtracted from $D(1,\theta)$, R(2) from $D(2,\theta)$, and in general, R(u) from $D(u,\theta)$.

8. The improvement as in claim 1 where said X-ray source and said detector unit are rotated around said body through an angle $\theta$ and where $\theta$ is divided into a plurality of angular subranges and where said means for extracting the sensitivity difference component extracts at least one sensitivity difference component for each of the angular subranges and where the means for correcting the sensitivity includes means for correcting the sensitivity of at least one channel in each said angular subrange with the sensitivity difference component extracted for that angular subrange.

9. The improvement as in claim 1 where said means for correcting the sensitivity difference of said at least one channel includes means for correcting the sensitivity difference of at least some of the remaining channels of the multi-channel detector with the sensitivity difference component extracted for said at least one channel.

10. The improvement as in claim 9 where said means for correcting the sensitivity difference includes means for correcting all of the remaining channels with the sensitivity component extracted for said at least one channel.

11. The improvement as in claim 9 where said X-ray source and said detector unit are rotated around said body through an angle $\theta$ and where said means for extracting the sensitivity difference component for said one channel includes means for extracting the sensitivity difference component for an angular subranges of $\theta$.

12. The improvement as in claim 9 where said detector unit includes a plurality of detecting element blocks each having a plurality of detecting elements and where said means for extracting the sensitivity difference component includes means for extracting the sensitivity difference component for at least one of the detecting elements of each block and where said means for correcting the sensitivity includes means for correcting the sensitivity of the channels in each block with the sensitivity difference component extracted for that block.

13. The improvement as in claim 12 where said at least one of the detecting elements of each block corresponds to at least one of the outermost detecting elements of the block.

14. The improvement as in claim 9 where said means for extracting the sensitivity difference component includes means for extracting the sensitivity difference component for at least one of the centrally positioned channels of the multi-channel detector.

* * * * *